(12) United States Patent
Vanluchene et al.

(10) Patent No.: US 10,710,278 B2
(45) Date of Patent: Jul. 14, 2020

(54) METHOD FOR PRODUCING AN ELASTOMERIC SKIN HAVING A GRAINED SURFACE

(71) Applicant: RECTICEL AUTOMOBILSYSTEME GMBH, Köningswinter (DE)

(72) Inventors: Yvan Vanluchene, Wetteren (BE); Yvan De Clercq, Wetteren (BE); Linda De Doncker, Wetteren (BE)

(73) Assignee: RECTICEL AUTOMOBILSYSTEME GMBH, Köningswinter (DE)

( * ) Notice: Subject to any disclaimer, the term of this patent is extended or adjusted under 35 U.S.C. 154(b) by 0 days.

(21) Appl. No.: 15/517,047

(22) PCT Filed: Oct. 12, 2015

(86) PCT No.: PCT/EP2015/073549
§ 371 (c)(1),
(2) Date: Apr. 5, 2017

(87) PCT Pub. No.: WO2016/058983
PCT Pub. Date: Apr. 21, 2016

(65) Prior Publication Data
US 2017/0239851 A1    Aug. 24, 2017

(30) Foreign Application Priority Data

Oct. 13, 2014    (EP) ..................... 14188691

(51) Int. Cl.
| | | |
|---|---|---|
| B29C 41/08 | (2006.01) | |
| B29C 37/00 | (2006.01) | |
| B29C 41/22 | (2006.01) | |
| B32B 33/00 | (2006.01) | |
| B29C 41/00 | (2006.01) | |
| B29L 31/30 | (2006.01) | |
| B29K 75/00 | (2006.01) | |

(52) U.S. Cl.
CPC ...... *B29C 37/0032* (2013.01); *B29C 37/0053* (2013.01); *B29C 41/003* (2013.01); *B29C 41/08* (2013.01); *B29C 41/22* (2013.01); *B32B 33/00* (2013.01); *B29C 2037/0035* (2013.01); *B29K 2075/00* (2013.01); *B29L 2031/3005* (2013.01); *B29L 2031/3041* (2013.01)

(58) Field of Classification Search
None
See application file for complete search history.

(56) References Cited

U.S. PATENT DOCUMENTS

| | | | | |
|---|---|---|---|---|
| 6,077,472 A | * | 6/2000 | Kataoka | B29C 45/0025 264/219 |
| 6,849,218 B1 | * | 2/2005 | De Winter | B29C 37/0032 264/240 |
| 7,078,102 B2 | * | 7/2006 | Robertson | C08G 18/0823 428/424.2 |
| 2015/0017404 A1 | | 1/2015 | Gayer et al. | |

FOREIGN PATENT DOCUMENTS

| | | |
|---|---|---|
| DE | 102008004303 A1 | 7/2009 |
| WO | 2013123960 A1 | 8/2013 |

* cited by examiner

*Primary Examiner* — Jacob T Minskey
(74) *Attorney, Agent, or Firm* — Browdy and Neimark, PLLC

(57) ABSTRACT

The present invention relates to a method for producing an elastomeric grained skin which comprises at least an elastomeric skin layer and a coating layer overlying the skin layer. The skin has at least a portion which has a grained surface, which comprises at least one elastomeric skin layer and which has at least one coating layer overlying the skin layer. To produce the skin a coating composition is applied onto at least a portion of a mould surface, which portion is grained, to produce said coating layer; and the elastomeric skin layer is moulded at least against a back side of said coating layer to produce said portion of the elastomeric skin. In order to accent the grain texture so that it stands out more clearly and so that the visibility thereof is less dependent on the direction of the incident light and the position of the viewer use is made of a coating composition which comprises effect pigment particles contained in a transparent or translucent medium.

19 Claims, No Drawings

METHOD FOR PRODUCING AN ELASTOMERIC SKIN HAVING A GRAINED SURFACE

The present invention relates to a method for producing an elastomeric grained skin which comprises at least an elastomeric skin layer and a coating layer overlying the skin layer.

Elastomeric grained skins are used as decorative surface coverings in a lot of different applications. Interior trim parts of automotive vehicles, such as dashboards, door panels, consoles, etc., are for example formed by a rigid substrate covered with a grained skin. The grained skin can show a leather texture but also other textures such as geometric textures or stipple textures.

The elastomeric skin layer can be made of a thermoplastic or a thermosetting material. A commonly used thermoplastic material is for example polyvinylchloride (PVC) whilst a commonly used thermosetting material is for example polyurethane (PU). These materials can be moulded against a grained mould surface. The elastomeric skin layer can form the visible front side of the skin. In this case, the elastomeric skin layer is coloured and is preferably light-stable. The colour of the skin can however also be provided by a coloured coating layer which overlies the front side of the skin layer. In this case the coating layer is opaque so that the skin layer is no longer visible and doesn't have to be light-stable.

In the known manufacturing processes, the coating layer can be applied either by a post-paint process onto the moulded skin layer or it can be applied as an in-mould coating onto the grained mould surface before moulding the skin layer against the back of this in-mould coating.

A drawback of the existing elastomeric grained skins is that the visibility of the texture provided onto the visible front side of the skin strongly depends on the position of the light source with respect to the skin and the viewer. In case the light falls in onto the grained surface of the skin under an angle of less than 90 degrees and is reflected towards the viewer, the texture can be seen quite clearly. When the light falls in from behind the viewer perpendicularly onto the textured surface, the texture can still be seen although somewhat less clearly. However, when the viewer looks perpendicularly onto the textured surface with the light source situated behind the elastomeric skin so that no light falls in directly onto the grained surface, the texture is often not or almost not visible.

An object of the present invention is to provide a new method for producing an elastomeric skin with a grained surface which enables to accent the grain texture so that it stands out more clearly and so that the visibility thereof is less dependent on the direction of the incident light and the position of the viewer.

To this end, the method for producing an elastomeric skin according to the present invention, wherein said skin has at least a portion which has a grained surface, which comprises at least one elastomeric skin layer and which has at least one coating layer overlying the skin layer comprises the steps of:
applying a coating composition onto at least a portion of a mould surface, which portion is grained, to produce said coating layer; and;
moulding said elastomeric skin layer at least against a back side of said coating layer to produce said portion of the elastomeric skin, and
wherein said coating composition is comprising effect pigment particles contained in a transparent or translucent medium.

For the purpose of the present invention, the term "transparent medium" is used herein to describe a medium that is able to transmit image-forming light. The distinctness of the image transmitted through the medium may be used as a measure of transparency.

For the purpose of the present invention, the term "translucent medium" is used herein to describe a medium that allows the transmission of light.

According to one embodiment of the method according to the present invention, the transparent or translucent medium can be a solvent wherein said solvent can be water, a water-based solvent or a non-aqueous solvent.

As used herein, the term "water-based solvent" means that the solvent comprises water.

As used herein, the term "non-aqueous solvent" refers to organic solvents which are substantially free of water.

For the purpose of the present invention, the expression "substantially free of water" means that the water content, relative to the total weight of the non-aqueous solvent, is lower than 0.01 wt. %, in particular lower than 0.005 wt. %, specifically lower than 0.001 wt. %, more specifically lower than 0.0005 wt. %, even more specifically lower than 0.0001 wt. %.

According to another embodiment of the method according to the present invention, the transparent or translucent medium can be a solvent/polymeric matrix medium.

In general, the solvent can be water, a water-based solvent or a non-aqueous solvent, preferably a water-based solvent. The polymeric matrices are the usual ones, as known in the art.

According to another embodiment of the method according to the present invention, the transparent or translucent medium can be a polymeric matrix medium substantially free of any solvent.

For the purpose of the present invention, the expression "substantially free of any solvent" means that the solvent content, relative to the total weight of the transparent or translucent medium, is lower than 0.01 wt. %, in particular lower than 0.005 wt. %, specifically lower than 0.001 wt. %, more specifically lower than 0.0005 wt. %, even more specifically lower than 0.0001 wt. %.

The term effect pigments embrace both metallic pigments and nacreous or pearlescent pigments. Metallic pigments are opaque to light, i.e. no light is transmitted, and reflect the incident light. They can consist for example of aluminium, titanium or copper. Pearlescent or nacreous pigments simulate the effect of natural pearl and are composed of thin platelets which are transparent in the visible region of the spectrum.

Effect pigments are often based on platelet shaped particles. Because the optical effect is the result of multiple reflections and transmission of light, it is desirable to provide particles that will align in the medium in which they are found and to optimize the desired effect. Effect pigments, particularly pigments based on mica, have long been used in automotive top coats in order to achieve a coloured metallic effect, among other reasons. That metallic effect can be characterized by the flip-flop of light to dark as the viewing angle is changed. In the case of mica pigments, that flip-flop is from the reflection colour of the mica to dark.

As said, the effect pigment particles are contained in a transparent or translucent medium, preferably said effect pigment particles are distributed in the transparent or translucent medium, more preferably said effect pigment particles are dispersed in the transparent or translucent medium.

According to the present invention, it was found that the presence of the effect pigments in the coating layer strongly enhances the visibility of the texture onto the visible front side of the elastomeric skin. WO 2013/123960 discloses already that a deep surface structure on injection moulded trim parts can be made more prominent by applying an effect coating onto the structured surface. To achieve this effect, the platelet shaped effect pigments should be parallel to the visible front side of the trim part.

In contrast to the present invention, the injection moulded trim parts disclosed in WO 2013/123960 are however not elastomeric and are provided with a deep structure instead of with a grained surface or texture. When applying an effect coating on a grained surface, the grain texture is lost to a small or a large extent due to the fact that in the valleys of the grain texture more coating composition accumulates than on the peaks. In the method according to the invention it is essential that the coating composition is applied onto the mould surface instead of on the skin layer. In this way, more coating composition accumulates on the peaks of the skin texture than in the valleys thereof. The peaks have thus a more metallic effect. Moreover, due to the fact that the effect pigment particles are contained in a transparent or translucent medium, the formed coating layer does not completely hide the skin layer and the hiding effect depends on the thickness of the coating layer. This means that in the valleys of the grained skin surface, the colour of the underlying skin layer has a larger effect on the colour of the visible front side of the skin than on the peaks. In case of a dark, usually black skin layer, shade effects are thus obtained which also enhances the visibility of the grain texture.

In a preferred embodiment of the method according to the present invention, said mould surface has a grain depth, determined as the surface roughness depth (Rz) measured in accordance with DIN EN ISO 4287:1998, of between 5 and 250 μm. Said grain depth is in particular smaller than 200 μm, preferably smaller than 175 μm, more preferably smaller than 150 μm and most preferably smaller than 125 μm. On the other hand, the grain depth is in particular larger than 15 μm, preferably larger than 30 μm, more preferably larger than 40 μm and most preferably larger than 50 μm.

Due to the fact that the coating layer is applied as an in-mould coating instead of as a post-paint coating, the grain depth of the grained surface of the skin corresponds to the grain depth of the mould surface. Notwithstanding these relatively small grain depths, the texture of the skin surface is not impaired but it is on the contrary accented.

In a further preferred embodiment of the method according to the present invention, said coating layer has an average thickness which is smaller than said grain depth, preferably smaller than 75% of said grain depth, more preferably smaller than 50% of said grain depth and most preferably smaller than 25% of said grain depth.

In an advantageous embodiment of the method according to the present invention, the coating layer has an average dry thickness of between 3 and 120 μm, the average thickness of said coating layer being preferably smaller than 100 μm, more preferably smaller than 90 μm, most preferably smaller than 80 μm and even more preferably smaller than 70 μm.

The coating composition, as used in the method of the present invention, is a liquid coating composition or is liquefied when being applied, such as a powder coating.

According to certain preferred embodiments of the method of the present invention, the coating composition is a liquid coating composition.

In a further advantageous embodiment of the method according to the present invention, the liquid coating composition has, at the temperature of the mould surface, a kinematic viscosity, measured at the temperature of the mould surface, which is smaller than 800 centistokes, preferably smaller than 600 centistokes, more preferably smaller than 400 centistokes, most preferably smaller than 200 centistokes.

Especially when the average thickness of the coating layer is relatively small compared to the depth of the grain texture, the use of such low viscous liquid coating composition produces relatively large differences in coating thickness and thus in the degree wherein the colour of the skin layer affects locally the colour of the grained surface of the skin, in particular in the valleys of the surface texture.

The present invention also relates to an elastomeric skin produced by the method of the present invention.

Other particularities and advantages of the invention will become apparent from the following description of some particular embodiments of the method and the elastomeric according to the present invention.

The elastomeric skin produced by the method of the present invention has at least a portion which comprises at least one elastomeric skin layer and a coating layer overlying the skin layer.

Next to said portion, the elastomeric skin may contain one or more further portions which have different properties such as notably a different composition, texture or colour. A method to produce in particular a skin having different colours is notably described in EP 1 896 240 B1 and EP 0 804 327 B1, which are hereby incorporated by reference in their entirety.

The term "elastomeric" indicates that the skin, or the skin layer, has an elongation, measured in accordance with DIN/EN/ISO 527-3, of at least 30% and preferably of at least 50%. The flexural modulus of the skin or of the skin layer, measured in accordance with ASTM D790-03, is preferably smaller than 100 MPa, more preferably smaller than 75 MPa and most preferably smaller than 55 MPa or even lower than 40 MPa. Generally, the overall density of the skin is larger than 300 kg/m$^3$, preferably larger than 500 kg/m$^3$ and more preferably larger than 600 kg/m$^3$.

The elastomeric skin has a visible front surface which is grained, i.e. which is provided with a texture. This texture can for example be an animal texture, in particular a leather texture, or a stipple structure, a geometric texture, etc. The grain depth of the textured surface, determined as the surface roughness depth (Rz) measured in accordance with DIN EN ISO 4287:1998, is generally comprised between 5 and 250 μm. This grain depth is in particular smaller than 200 μm, preferably smaller than 175 μm, more preferably smaller than 150 μm and most preferably smaller than 125 μm and/or this grain depth is in particular larger than 15 μm, preferably larger than 30 μm, more preferably larger than 40 μm and most preferably larger than 50 μm.

The coating layer has preferably an average thickness which is smaller than said grain depth, preferably smaller than 75% of said grain depth, more preferably smaller than 50% of said grain depth and most preferably smaller than 25% of said grain depth. The average thickness of the coating layer can be determined by dividing the volume thereof by the surface area of the skin layer which is coated with this coating layer (not including the additional surface area provided by the texture). The coating layer has in particular an average thickness of between 3 and 120 μm, the average thickness of said coating layer being preferably smaller than 100 μm, more preferably smaller than 90 μm, most preferably smaller than 80 μm and even more preferably smaller than 70 μm but larger than 5 μm, preferably larger than 7 μm and more preferably larger than 10 μm.

For producing the skin, a grained mould surface is provided. The grain of this mould surface is a negative of the grain of the visible front surface of the skin. The mould surface has in particular also a grain depth, determined as the surface roughness depth (Rz) measured in accordance with DIN EN ISO 4287:1998, of between 5 and 250 µm. This grain depth is preferably smaller than 200 µm, more preferably smaller than 175 µm, most preferably smaller than 150 µm and even more preferably smaller than 125 µm. The said grain depth of the grain on the mould surface is preferably larger than 15 µm, more preferably larger than 30 µm, most preferably larger than 40 µm and even more preferably larger than 50 µm.

In a first step, a mould release agent is preferably applied onto the mould surface. Subsequently, a liquid coating material for producing a clear coat can be applied onto the mould surface, for example by spraying. Such a clear coat layer can provide a protective layer to increase in particular the mar and scratch resistance of the skin. A clear coat layer is however optional and thus not essential. It is further understood that when a clear coat is applied that the grain depth of the mould surface need to be determined after having applied said clear coat since part of the initial grain depth may be lost by applying the clear coat layer before the effect coat layer is applied. In a next step, a liquid coating composition is applied onto the mould surface to produce the coating layer, preferably by spraying (including atomizing). The liquid coating composition may be water or solvent-based (i.e. water or solvent borne), preferably water based. It is liquid and has a relatively low viscosity at the temperature of the mould surface. Its kinematic viscosity, measured at the temperature of the mould surface is in particular smaller than 800 centistokes, preferably smaller than 600 centistokes, more preferably smaller than 400 centistokes, most preferably smaller than 200 centistokes.

The kinematic viscosity of a liquid coating composition can be determined according to the Ford Viscosity testing Cup method (i.e. the ASTM D1200-94 method for viscosity) at particular temperature by using FORD viscosity flow Cups, such as notably FORD #4 cup or FORD #5 cup. As a result of the low viscosity of the liquid coating composition, the coating layer follows closely the grain of the mould surface. The grain depth of the grain on the surface of the skin therefore corresponds substantially to the grain depth of the negative grain on the mould surface. The liquid coating composition is applied in such an amount on the mould surface that after drying of the liquid coating composition, i.e. after evaporation of the water and/or the solvent, a dry coating layer is achieved having the above described average dry coating thickness.

Due to the low viscosity of the liquid coating composition, and due to the relatively small dry coating thickness compared to the grain depth, the liquid coating composition runs off from the peaks of the grain texture on the mould surface and accumulates in the valleys thereof. Since the grain on the skin is a negative impression of the grain on the mould surface, the coating thickness on the skin is thus smaller in the valleys than on the peaks of the grain.

An essential feature of the liquid coating composition is that it comprises effect pigment particles which are contained, preferably distributed, more preferably dispersed in a transparent or translucent medium. The effect pigments are thus visible within said transparent or translucent medium.

This transparent or translucent medium may further contain dyes to provide a certain colour. The liquid coating composition may also contain pigments other than the effect pigment particles which also increase the hiding power of the coating composition.

The liquid coating composition is however preferably free of pigments different from effect pigments, or contains preferably at most 1% by dry weight of such pigments. The effect pigments also increase the hiding power of the coating composition, especially non-transparent effect pigments such as metallic pigments.

The hiding power of the coating composition can be quantified as the dry film thickness at hide. The larger the dry film thickness at hide, the smaller the hiding power and vice versa. Dry film thickness at hide can be determined by preparing the samples according to ASTM D6762-02, a standard test method for determining the hiding power of paint by visual evaluation of spray applied coatings and then testing the prepared samples according to ASTM D1400-00 standard test method for non-destructive measurement of dry film thickness of non-conductive coatings applied to non-ferrous metal base.

The thickness of the coating layer is preferably selected depending on the hiding power of the liquid coating composition. The coating layer has more particularly an average thickness which is preferably smaller than 300% of the dry film thickness at hide of the liquid coating composition and more preferably smaller than 200% of said dry film thickness at hide, more preferably smaller than 100% of said dry film thickness at hide, even more preferably smaller than 80% of said dry film thickness at hide, most preferably smaller than 50% of said dry film thickness at hide.

According to certain embodiments of the present invention, in at least 5%, preferably at least 15%, more preferably at least 25%, even more preferably at least 50% of the surface area of said portion of the elastomeric skin, the coating layer has a thickness smaller than said dry film thickness at hide.

Due to the non-uniform distribution of the coating composition onto the mould surface, as a result of the grain on the mould surface, the colour of the elastomeric skin layer penetrates partially through the coating layer and this at least where this coating layer has the smallest thickness, i.e. in the valleys of the grain texture.

The elastomeric skin layer and the coating layer may have the same colour or a different colour.

In one preferred embodiment of the present invention, the elastomeric skin layer has a dark colour.

A dark-coloured elastomeric skin layer may provide improved shadow effects in particular in the valleys of the grain texture.

As used herein "dark-colour" refers to the black colour as well as to colours approaching black in hue, including, for example, dark grey, dark blue, dark green, dark brown, and the like.

In general, the darkness of a colour can be quantified by using the CIE Lab standard value L* value, as notably defined by the CIE (Commission Internationale de l'Eclairage) in 1976.

CIE L*a*b* (CIELAB) is a color space specified by the International Commission on Illumination. The L*a*b* color space includes all perceivable colors, and one of the most important attributes of the L*a*b* color space is the device independency, meaning that the colors are independent of their nature of creation. The three coordinates of CIELAB represent the lightness of the color (L*=0 yields black and L*=100 indicates diffuse white (specular white might be higher)), its position between red/magenta and green (a*, negative values indicate green, while positive values indicate magenta) and its position between yellow and blue (b*, negative values indicate blue and positive values indicate yellow).

For the purpose of the present invention, a dark-coloured elastomeric skin layer is intended to denote an elastomeric skin layer having a L* value of lower than 50, preferably lower than 30, more preferably lower than 20, even more preferably lower than 10.

When the L* value of the elastomeric skin layer is 0 then the elastomeric skin layer is black.

It is further understood that when the elastomeric skin layer and the coating layer are having a different colour that the L* value of the elastomeric skin layer [herein after, $L^*_{elas\_skin}$] is lower than the L* value of the coating layer [herein after, $L^*_{cl}$].

According to a preferred embodiment of the present invention, the difference between $L^*_{cl}$ and $L^*_{elas\_skin}$ [i.e. $\Delta L^* = L^*_{cl} - L^*_{elas\_skin}$] of at least 10, preferably of at least 20, more preferably of at least 30.

In accordance with the present invention, the visible appearance of the grain on the skin is further intensified by providing effect pigments in the coating layer. These effect pigments are dispersed in the transparent or translucent medium. The effect pigments comprise metallic pigments and/or nacreous or pearlescent pigments.

The metallic pigments may comprise finely divided metals, finely divided metal derivatives, and metal-coated particulate materials. The metallic pigments may impart a metallic finish to the skin. The metallic pigment may be in any suitable form, for example, in the form of particles, flakes, platelets, or fibres which may, if desired, be coated with an organic substance to aid dispersion in the transparent or translucent medium. Examples of suitable metals are nickel, aluminium, stainless steel and silver, and alloys containing one or more of these metallic materials. Examples of metal derivatives are oxides, carbonyl compounds or salts. Materials in which a metal coating is applied to a particulate material include, for example, nickel coated graphite and silver-coated graphite. Metallic pigments, if used, are advantageously present in a proportion of 5 to 25 wt %, preferably 10 to 20 wt %, based on the weight on the liquid coating composition.

Nacreous pigments include, for example, micaceous or ultrafine titanium dioxide, bismuth oxychloride; bismuth oxychloride or mica coated with titanium dioxide; an iron oxide; and chromium oxide or hydroxide. Nacreous pigments, that is, materials which can impart a pearlescent effect to coatings containing them, may, if desired, be used together with finely divided metallic pigments to enhance the decorative effect provided by the metals. Some pearlescent materials, for example, mica coated with titanium dioxide, also give a "sparkle" appearance. When nacreous pigments are used, they are advantageously present in a proportion of 5 to 25 wt %, preferably 10 to 20 wt %, based on the weight of the liquid coating composition.

The coating compositions or lacquers according to the invention may be formulated based on solvents, but they are preferably water-based coatings, the binder of which is stabilised in a suitable manner, e.g. anionically, cationically or non-ionically. Polyesters, polyurethanes and/or (meth) acrylic copolymer resins can be used as the binder (base resins), for example. The preferred aqueous effect base lacquers preferably contain polyurethane resins, most preferably in a proportion of at least 15% by weight with respect to the solid resin content of the aqueous effect base lacquer.

In addition to the usual physically drying and/or chemically crosslinking binder systems, the effect coating compositions may also contain customary auxiliary substances, such as extenders, crosslinkers, catalysts, levelling agents, anti-cratering agents or light stabilisers for example, optionally in combination with antioxidants.

Examples of solvent-based effect coatings or coating systems which can be used as liquid coating composition can be found in DE-A-29 24 632, DE-A-42 18 106, EP-A-0 302 296, WO-91/00895 and WO-95/05425.

Examples of water-based effect coatings or coating systems which are preferably used as liquid coating composition can be found in DE-A-38 41 540, DE-A-41 22 266, EP-A-0 089 497, EP-A-0 287 144 and EP-A-0 427 979 and especially in DE-A-36 28 124, DE-A-40 25 264, EP-A-0 379 158, EP-A-0 512 524, EP-A-0 581 211 and EP-A-0 584 818.

After having applied the liquid coating composition onto the mould surface, and after having dried this coating composition at least partially by allowing the water and/or solvent to evaporate to produce the coating layer, the elastomeric skin layer is moulded against the back of this coating layer.

The elastomeric skin layer of the present invention is preferably light stable.

The elastomeric skin layer may be made of a thermoplastic material in particular a thermoplastic elastomer (TPE) such as TPO, PVC or EV. Such thermoplastic materials can be moulded for example by a liquid or powder slush moulding process against the back of the coating layer.

The skin layer is however preferably made starting from a curable composition, in particular from at least one curable liquid polyurethane composition. This curable composition is preferably free of solvent or comprises at most 5% by weight of solvent. The elastomeric skin layer is obtained by allowing the applied curable composition to cure.

The curable polyurethane composition is preferably an aliphatic polyurethane composition, i.e. a polyurethane composition which is based on an isocyanate component wherein the isocyanate groups are not directly attached to an aromatic group so that a light-stable polyurethane material is achieved. Examples of such isocyanate components are IPDI, HDI, etc. Use can be made in particular of the light-stable coloured polyurethane reaction mixtures described in EP-B-0 303 305, EP-B-0 379 246, WO 98/14492, EP-B-0 929 586 and WO 2004/000905, which are included herein by reference.

Alternatively, a further in-mould coating, which is either water or solvent based, can be applied first against the back of the coating layer. By the presence of pigments in this in-mould coating layer, the hiding power can be increased so that no light can penetrate to the elastomeric skin layer. This layer therefore does not need to be light-stable and can thus be formed by an aromatic elastomeric polyurethane layer.

When the elastomeric skin layer is as such not thick enough to provide the necessary mechanical properties to the skin, for example the required tensile strength, a further elastomeric skin layer can be moulded against the back of the first elastomeric skin layer. This further elastomeric skin layer is preferably an aromatic polyurethane skin layer. A composite skin layer is thus obtained in the way as described in particular in WO 2007/137623, which is included herein by reference.

The skin of the present invention can be fixed to a substrate layer to achieve a trim part. The substrate layer is preferably fixed to the skin by a so-called back foam process wherein a foam layer is produced between the skin and the substrate. This foam layer adheres the skin to the rigid substrate and provides for a soft touch.

The invention claimed is:

1. A method for producing an elastomeric skin, wherein said skin has at least a portion which has a grained surface having valleys and peaks, which comprises at least one elastomeric skin layer and which has at least one coating layer overlying the skin layer, which method comprises the steps of:

applying a low viscosity coating composition, comprising effect pigment particles contained in a transparent or translucent medium, onto at least a portion of a mould surface, which portion is grained by having valleys and peaks to produce said coating layer, said mould surface having a grain depth and said coating layer having an average dry thickness which is smaller than said grain depth; and moulding said elastomeric skin layer at least against a back side of said coating layer to produce said portion of the elastomeric skin, wherein said low viscosity coating composition has a viscosity of less than 800 centistoke at the temperature of the mould surface and is a liquid coating composition or is liquefied when being applied and said coating layer of said portion of the elastomeric skin has a thickness that is smaller in the valleys of said portion of the elastomeric skin than in the peaks of said portion of the elastomeric skin.

2. A method according to claim 1, wherein said elastomeric skin layer and the coating layer have a different colour and the colour of said elastomeric skin layer penetrates partially through the coating layer at least in the valleys of said portion of the elastomeric skin.

3. A method according to claim 1, wherein said mould surface has a grain depth, determined as the surface roughness depth (Rz) measured in accordance with DIN EN ISO 4287:1998, of between 5 and 250 µm.

4. A method according to claim 1, wherein said grain depth is smaller than 200 µm and/or said grain depth is larger than 15 µm.

5. A method according to claim 1, wherein said coating composition has a predetermined dry film thickness at hide and in at least 5% of the surface area of said portion of the elastomeric skin, the coating layer has a thickness smaller than said dry film thickness at hide.

6. A method according to claim 1, wherein said elastomeric skin layer is light stable.

7. A method according to claim 1, wherein said coating layer has an average thickness of between 3 and 120 µm.

8. A method according to claim 1, wherein said elastomeric skin layer is moulded against the back side of the coating layer by applying at least one curable liquid polyurethane composition onto the back side of the coating layer and by allowing this curable polyurethane composition to cure to produce said elastomeric skin layer.

9. A method according to claim 8, wherein said curable polyurethane composition is an aliphatic polyurethane composition which is based on an isocyanate component wherein the isocyanate groups are not directly attached to an aromatic group.

10. A method according to claim 8, wherein said liquid polyurethane composition is sprayed onto the back side of the coating layer.

11. A method according to claim 1, wherein said effect pigment particles comprise metallic pigment particles and/or nacreous pigment particles.

12. A method according to claim 1, wherein said liquid low viscosity coating composition is sprayed onto the mould surface.

13. A method according to claim 1, wherein before applying said liquid low viscosity coating composition onto the mould surface a further liquid coating material is applied thereon to produce a clear coat layer.

14. A flexible skin obtained by a method according to claim 1.

15. A method according to claim 1, wherein said liquid coating composition has a predetermined dry film thickness at hide and said coating layer has an average thickness which is smaller than 300% of said dry film thickness at hide.

16. A method according to claim 1, wherein said elastomeric skin layer and the coating layer have a different colour wherein the difference between the L* value of the coating layer and the L* value of the elastomeric skin layer [i.e. $\Delta L^* = L^*_{cl} - L^*_{elas\_skin}$] is of at least 10.

17. The method of claim 1, wherein the low viscosity coating composition has a viscosity of less than 600 centistoke at the temperature of the mould surface.

18. The method of claim 1, wherein the low viscosity coating composition has a viscosity of less than 400 centistoke at the temperature of the mould surface.

19. The method of claim 1, wherein the low viscosity coating composition has a viscosity of less than 200 centistoke at the temperature of the mould surface.

* * * * *